(12) United States Patent
Haensel et al.

(10) Patent No.: US 7,170,195 B2
(45) Date of Patent: Jan. 30, 2007

(54) CIRCUITS AND METHODS FOR FLEXIBLE CURRENT PARTITIONING IN MONOLITHIC SWITCHING REGULATORS

(75) Inventors: Howard H. Haensel, Saratoga, CA (US); Yuhui Chen, Fremont, CA (US); Randy G. Flatness, Los Gatos, CA (US)

(73) Assignee: Linear Technology Corporation, Milpitas, CA (US)

(*) Notice: Subject to any disclaimer, the term of this patent is extended or adjusted under 35 U.S.C. 154(b) by 204 days.

(21) Appl. No.: 10/962,302

(22) Filed: Oct. 8, 2004

(65) Prior Publication Data

US 2006/0076936 A1  Apr. 13, 2006

(51) Int. Cl.
*H02J 1/00* (2006.01)
(52) U.S. Cl. ............................. 307/43; 307/52; 307/113
(58) Field of Classification Search .................. 307/43, 307/52, 113, 64, 85, 86, 134
See application file for complete search history.

(56) References Cited

U.S. PATENT DOCUMENTS

| | | | | |
|---|---|---|---|---|
| 4,847,742 A | * | 7/1989 | Ohashi et al. ............ 363/21.14 |
| 6,137,274 A | * | 10/2000 | Rajagopalan ............... 323/272 |
| 6,246,222 B1 | * | 6/2001 | Nilles et al. ................ 323/283 |
| 6,301,133 B1 | * | 10/2001 | Cuadra et al. ................ 363/65 |
| 6,628,015 B2 | * | 9/2003 | Pullmann et al. ........... 307/326 |
| 6,744,151 B2 | * | 6/2004 | Jackson et al. ............... 307/43 |

OTHER PUBLICATIONS

LTC3407 Dual Synchronous, 600mA, 1.5MHz Step-Down DC/DC Regulator, Linear Technology Corporation, Datasheet, pp. 1-16, (Dec. 2003).
LTC3407 Dual Synchronous, 600mA, 1.5MHz Step-Down DC/DC Regulator, Linear Technology Corporation, Initial Release datasheet, pp. 1-16, (Jul. 2003).

* cited by examiner

*Primary Examiner*—Bao Q. Vu
(74) *Attorney, Agent, or Firm*—Fish & Neave IP Group Ropes & Gray LLP; Gall C. Gotfried

(57) ABSTRACT

A monolithic switching regulator that flexibly distributes its output current among its output channels is provided. The monolithic switching regulator includes one or more additional channels that are externally connected to the output channels for providing additional current partitioning configurations. The external connections may be autosensed or programmed with an additional input pin. A switching logic circuit is provided for distributing the current among the output channels according to their external connections to the additional channels.

21 Claims, 8 Drawing Sheets

CIRCUITS AND METHODS FOR FLEXIBLE CURRENT PARTITIONING IN MONOLITHIC SWITCHING REGULATORS

FIELD OF THE INVENTION

This invention relates generally to switching regulators. More specifically, the present invention provides circuits and methods for achieving flexible current partitioning in monolithic switching regulators.

BACKGROUND OF THE INVENTION

Regulators are an essential component of most electronic devices which operate at a specified DC voltage or current. Typically, the electronic devices are powered with a source voltage that is fluctuating (e.g., provided by a power supply connected into a wall socket) or at an inappropriate amplitude (e.g., provided by a battery). The purpose of a regulator is to convert the source voltage into the operating DC voltage or current of the electronic devices.

One type of a commonly used regulator is a switching regulator. Switching regulators employ one or more switching elements and an inductor, transformer, and/or a capacitor as an energy storage element between the source and the load. The switching elements may be, for example, power metal-oxide semiconductor field-effect transistor (MOSFET) switches. The switching regulator regulates the voltage or current across the load by varying the ON-OFF times of the switching elements so that power is transmitted through the switching elements and into the energy storage element. The current pulses may be generated by one-shot timers or other circuitry. The energy storage element converts the current pulses into a steady load current so that the load voltage is regulated.

Switching regulators may be designed in a single monolithic device that integrates all of the switching elements inside the device. Monolithic switching regulators reduce the design complexity, improve reliability, and are easier to maintain than traditional regulators. Additionally, they may be designed with multiple channels in a multi-channel configuration.

Multi-channel monolithic switching regulators provide more than one channel in a single device. A channel consists of a switching element and associated energy elements. They may be more efficient in terms of device utilization than single-channel switching regulators and reduce the number of external components required for power management in an electronic device. An example of a multi-channel switching regulator includes the LTC3407 sold by Linear Technology Corporation, of Milpitas, Calif.

Both single-channel and multi-channel switching regulators lack the flexibility of current programming. The maximum current of a monolithic switching regulator is usually fixed by design and cannot be scaled up or down by the designer. The designer cannot typically select the portion of total current that is allocated to each channel.

For example, a designer of a dual-channel 2 A/2 A power supply that delivers 2 A on each channel needs to use a different dual-channel monolithic switching regulator than a designer of a dual-channel 3 A/1 A power supply that delivers 3 A on one channel and 1 A on the other channel, even though the total current output of the two power supplies is the same. Such inflexibility adds development and bill-of-material costs to power supply designers. A 3 A/1 A power supply designer often ends up using a 3 A/3 A monolithic switching regulator because of the limited design selection offered by IC manufacturers.

In view of the foregoing, it would be desirable to provide circuits and methods for providing flexible current partitioning among the multiple channels in a multi-channel monolithic switching regulator.

It further would be desirable to provide circuits and methods for autosensing the channel connections for programming current partitioning in multi-channel monolithic switching regulators.

It also would be desirable to provide circuits and methods for converting a multi-channel, multi-output switching regulator into a multi-channel, single-output regulator and into a single-channel, single-output regulator using current partitioning.

SUMMARY OF THE INVENTION

In view of the foregoing, it is an object of the present invention to provide circuits and methods for providing flexible current partitioning among the multiple channels in a multi-channel monolithic switching regulator.

It is a further object of the present invention to provide circuits and methods for autosensing the channel connections for programming current partitioning in multi-channel monolithic switching regulators.

It also is an object of the present invention to provide circuits and methods for converting a multi-channel, multi-output switching regulator into a multi-channel, single-output regulator and into a single-channel, single-output regulator using current partitioning.

These and other objects of the present invention are accomplished by providing circuits and methods for partitioning the current among multiple output channels of a multi-channel monolithic switching regulator. The circuits and methods involve providing one or more additional channels, hereinafter referred to as "middle channels," to enable flexible current partitioning among the output channels.

For example, in a multi-channel, dual-output monolithic switching regulator having two output channels, an additional middle channel is provided to connect to one or both output channels. The addition of the middle channel enables a power supply designer to partition the total current provided by the monolithic switching regulator among the two output channels, thereby achieving additional current partitioning configurations that are more flexible than those provided by other currently-available monolithic switching regulators.

Each current partitioning configuration is dependent on which output channel or channels the middle channel is connected to. For example, connecting the middle channel to both output channels will convert the dual-output regulator into a single-channel, single-output regulator.

In one embodiment, current partitioning is provided by an additional input pin, hereinafter referred to as the "PROG" pin, that is used to program the association of the middle channel to one or both output channels. For example, when the middle channel and the output channels are all connected together and the PROG pin is left floating, the multi-channel, dual-output regulator will operate as a single-channel, single-output regulator. Alternatively, when the middle channel is connected to the top channel and the PROG pin is connected to Vcc, the multi-channel regulator will provide a current on the top channel that is equal to the sum of the current normally provided in the top channel and the current normally provided in the middle channel when the channels are not interconnected. Other current partitioning configurations are described below.

In a preferred embodiment, an additional PROG pin is not provided. The power supply designer externally connects the middle channels as desired. A sensor and switching logic circuit then senses the connection of the middle channels and distributes the current to the output channels according to the external connection of the middle channels.

The sensor and switching logic circuit senses the external connection of the middle channels by turning the top and bottom switching elements in the middle channels ON/OFF while all the switching elements corresponding to the other channels are turned OFF. Voltage comparators monitor the voltages on the other channels and the sensor and switching logic circuit determines how the middle channels are connected externally. In a preferred embodiment, the sensing period is performed during the initial start-up phase of the monolithic switching regulator.

Advantageously, the present invention enables a multi-channel monolithic switching regulator to be used in multiple current partitioning configurations. The present invention also enables a multi-channel, multi-output monolithic switching regulator to operate as a single-channel, single-output or multi-channel, single-output monolithic switching regulator.

Also, advantageously, the switching elements may be field-effect transistor (FET) switches, junction field-effect transistor (JFET) switches, bipolar junction transistor (BJT) switches, metal oxide semiconductor field-effect transistor (MOSFET) switches, diodes, and/or other switches known to those of ordinary skill in the art or otherwise.

BRIEF DESCRIPTION OF THE DRAWINGS

The foregoing and other objects of the present invention will be apparent upon consideration of the following detailed description, taken in conjunction with the accompanying drawings, in which like reference characters refer to like parts throughout, and in which.

DETAILED DESCRIPTION OF THE INVENTION

Figure 1:
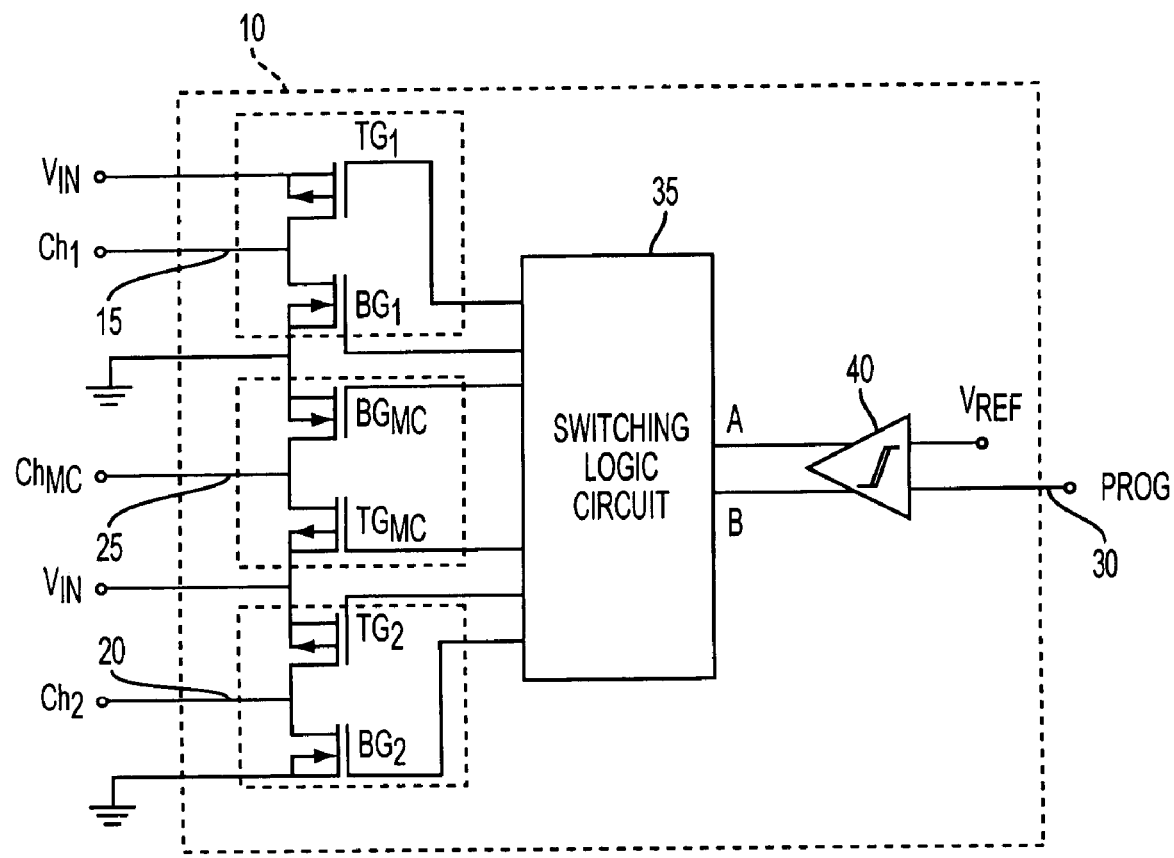
FIG. 1 is an illustrative circuit diagram showing one exemplary embodiment of a multi-channel, dual-output monolithic switching regulator in accordance with the principles of the present invention.

Referring to FIG. 1, an illustrative circuit diagram showing one exemplary embodiment of a multi-channel, dual-output monolithic switching regulator in accordance with the principles of the present invention is described. Multi-channel monolithic switching regulator 10 has two output channels, namely channels 15 ("$Ch_1$") and 20 ("$Ch_2$"), to provide a regulated voltage or current at an output load. Multi-channel regulator 10 also has additional channel 25 ("$Ch_{MC}$"), referred to as "middle channel" 25, and additional input pin 30, referred to as "PROG" input pin 30, to enable flexible current partitioning between output channels 15 and 20.

Flexible current partitioning is achieved by connecting middle channel 25 to one or both of output channels 15 and 20 and by programming PROG input pin 30. The total current provided by multi-channel regulator 10 will be distributed to output channels 15 and 20 according to whether input pin 30 is connected to ground, $V_{CC}$, a fraction of $V_{CC}$ or left floating.

The current distribution is controlled by switching logic circuit 35. Switching logic circuit 35 takes inputs "A" and "B" from comparator 40 and distributes the current to output channels 15 and 20 according to the logic values attributed to inputs A and B as a result of the logic value of PROG input pin 30 as compared to reference voltage "$V_{REF}$". Table 1 illustrates an exemplary current distribution provided by multi-channel regulator 10:

TABLE 1

Exemplary current distribution

| A | B | PROG Pin 30 Configuration | Channel Connection | Current Distribution |
|---|---|---|---|---|
| 1 | 0 | Vcc | $Ch_{MC}$ connected to $Ch_1$ | $I_{OUT1} = I_{Ch1} + I_{ChMC}$<br>$I_{OUT2} = I_{Ch2}$ |
| 0 | 1 | Ground | $Ch_{MC}$ connected to $Ch_2$ | $I_{OUT1} = I_{Ch1}$<br>$I_{OUT2} = I_{Ch2} + I_{ChMC}$ |
| 0 | 0 | ½ Vcc | $Ch_{MC}$ disconnected | $I_{OUT1} = I_{Ch1}$<br>$I_{OUT2} = I_{Ch2}$ |
| 1 | 1 | Floating | Single channel operation ($Ch_1$, $Ch_2$, $Ch_{MC}$ all connected together) | $I_{OUT} = I_{Ch1} + I_{ChMC} + I_{Ch2}$ |

For example, when the designer connects middle channel 25 ($Ch_{MC}$) to output channel 15 ($Ch_1$) and connects PROG input pin 30 to $V_{CC}$, the output current provided by output channel 15 will be the sum of the current provided by output channel 15 ($Ch_1$) and the current provided by middle channel 25 ($Ch_{MC}$) when output channel 15, output channel 20, and middle channel 25 are not interconnected, that is:

$$I_{OUT1} = I_{Ch1} + I_{ChMC}$$

The current provided by output channel 20 ($Ch_2$) in this configuration will simply be the current that is normally provided by output channel 20 ($Ch_2$) when output channel 15, output channel 20, and middle channel 25 are not interconnected, that is:

$$I_{OUT2} = I_{Ch2}$$

Alternatively, when output channel 15, output channel 20, and middle channel 25 are interconnected and PROG input pin 30 is left floating, multi-channel regulator 10 will operate as a single-channel, single-output regulator that provides an output current equal to the sum of the currents provided by each channel individually, that is:

$$I_{OUT}=I_{Ch1}+I_{ChMC}+I_{Ch2}$$

Multi-channel regulator 10 therefore provides the designer with flexible current configurations by distributing the output current among output channel 15, output channel 20, and middle channel 25 according to the value of PROG input pin 30 and the connection between channels 15, 20, and 25.

It should be understood by one skilled in the art that the current distribution shown in Table 1 is an exemplary current distribution shown for illustration purposes only. Other combinations are possible depending on the value assigned to PROG input 30, the connection between channels 15, 20, and 25, and the design of switching logic circuit 35. It should also be understood by one skilled in the art that PROG input 30 may be connected to different voltage levels. For example, PROG input pin 30 may be connected to a voltage level that is a fraction of $V_{cc}$, e.g., ¼ of $V_{CC}$.

It should also be understood by one skilled in the art that multi-channel regulator 10 may be designed as a buck, boost, or buck-boost regulator, current-mode or voltage-mode, or any other type used to implement monolithic switching regulators. According to its implementation, multi-channel regulator 10 may have other circuit components commonly implemented in regulators not shown in FIG. 1, such as error amplifiers, control circuitry, inductors, capacitors, etc.

In addition, one skilled in the art should understand that multi-channel regulator 10 is shown for illustration purposes only, and other multiple channel configurations may be used in accordance with the principles of the present invention. For example, a quad-channel regulator may be designed with several additional middle channels and associated PROG pins to achieve a higher number of current partitioning configurations.

Referring now to FIGS. 2A–E, illustrative circuit diagrams showing the external channel connections for achieving the exemplary current distribution shown in Table 1 for the multi-channel, dual-output monolithic switching regulator shown in FIG. 1 are described. Multi-channel switching regulators 41–44 and 46 have two output channels, "$Ch_1$" and "$Ch_2$" and an additional middle channel, "$Ch_{MC}$", that are externally connected to provide the exemplary current distribution configurations illustrated in Table 1. Multi-channel switching regulators 41–44 and 46 also have an additional "PROG" input pin as discussed above with reference to FIG. 1.

Multi-channel switching regulator 41 provides the current distribution illustrated in row 1 of Table 1, multi-channel switching regulators 42 and 46 provide the current distribution illustrated in row 2 of Table 1, multi-channel switching regulator 43 provides the current distribution illustrated in row 3 of Table 1, and multi-channel switching regulator 44 provides the current distribution of row 4 of Table 1.

Figure 2A:
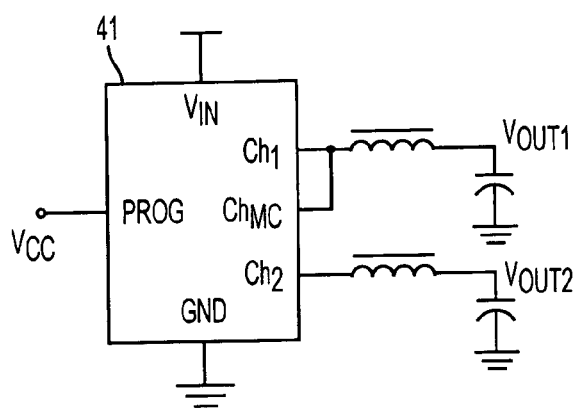
FIGS. 2A–E are illustrative circuit diagrams showing the external channel connections for achieving the exemplary current distribution shown in Table 1 for the multi-channel, dual-output monolithic switching regulator shown in FIG. 1.
Figure 2B:
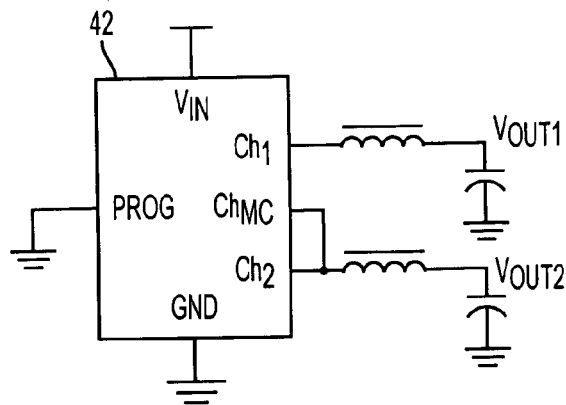
Figure 2C:
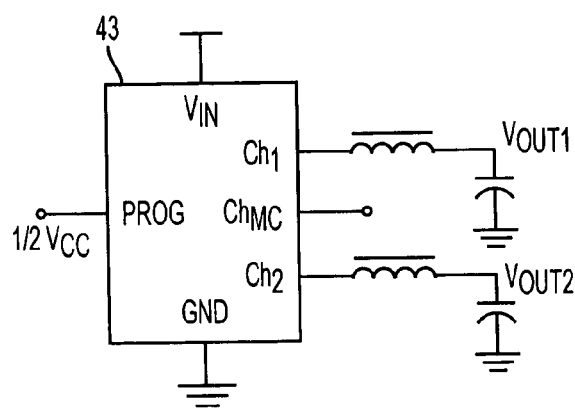
Figure 2D:
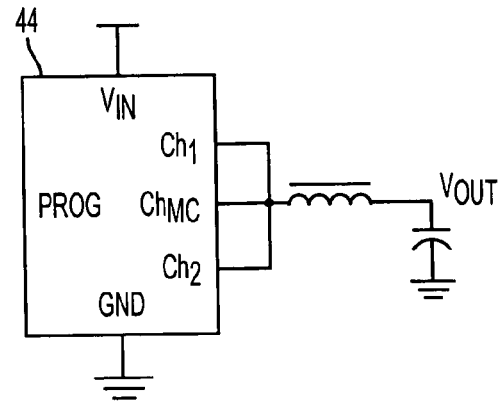
Figure 2E:
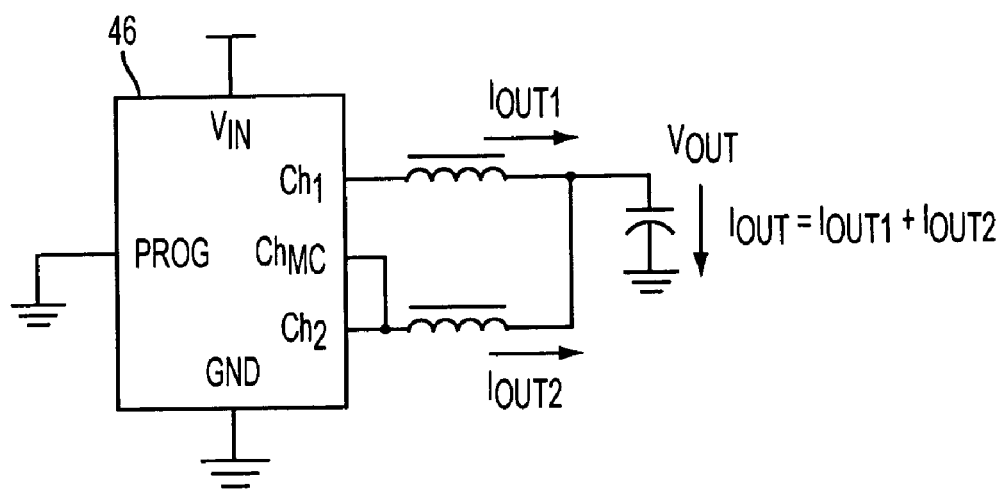

Switching regulator 46 shown in FIG. 2E operates as a multi-channel, single-output switching regulator by externally connecting $Ch_1$ and $Ch_2$ at the output capacitor. In this exemplary configuration, $Ch_1$ provides more current than $Ch_{MC}$ and $Ch_2$ individually but approximately the same current provided by the sum of $Ch_{MC}$ and $Ch_2$. By connecting the channels together as shown in FIG. 2E, the designer can easily convert a multi-channel, multi-output switching regulator into a multi-channel, single-output switching regulator as desired.

Figure 3:
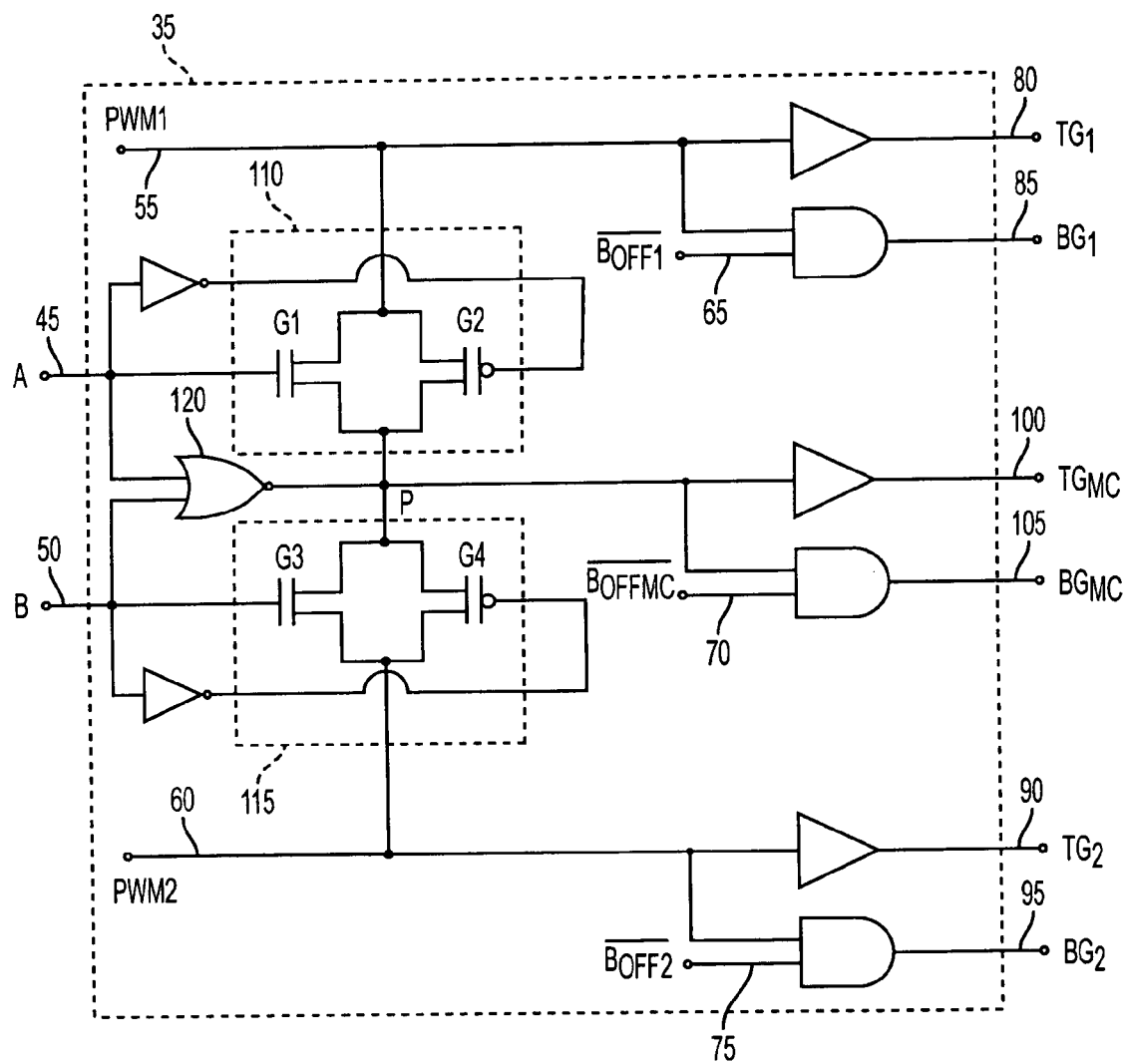
FIG. 3 is an illustrative circuit diagram of a switching logic circuit for use with the multi-channel, dual-output monolithic switching regulator shown in FIG. 1.

Referring now to FIG. 3, an illustrative circuit diagram of a switching logic circuit for use with the multi-channel monolithic switching regulator shown in FIG. 1 is described. Switching logic circuit 35 has seven inputs, namely: (1) input 45 ("A") coming from comparator 40 shown in FIG. 1; (2) input 50 ("B") coming from comparator 40 shown in FIG. 1; (3) input 55 ("PWM1") coming from a PWM logic block inside multi-channel regulator 10; (4) input 60 ("PWM2") coming from another PWM logic block inside multi-channel regulator 10; (5) input signal 65 ("$\overline{B_{OFF1}}$"); (6) input signal 70 ("$\overline{B_{OFFMC}}$"; and (7) input signal 75 ("$\overline{B_{OFF2}}$").

Switching logic circuit 35 will program the current distribution to its output channels depending on the connections of output channel 15, output channel 20, and middle channel 25 and on the logic values of inputs 45 (A) and 50 (B).

The current is distributed to outputs 80–105 through transmission gates 110 and 115. For example, when the logic value at input 45 (A) is high, transistors G1 and G2 of transmission gate 110 will be turned "ON." When the logic value at input 50 (B) is low, both transistors G3 and G4 of transmission gate 115 will be turned "OFF". In this case, transmission gate 110 acts as a "pass-through" gate, with its input connected through to its output, while transmission gate 115 acts as an open circuit.

As a result, node "P" of transmission gates 110 and 115 will be connected to input 55 (PWM1). Both output 80 ($TG_1$) and output 100 ($TG_{MC}$) will be connected to input 55 (PWM1). Output 85 ($BG_1$) and output 105 ($BG_{MC}$) will be connected together, so that output channel 15 will provide a current that is the sum of the current provided to output channel 15 and the current provided to middle channel 25 when those channels are not connected. The current provided to output channel 20 will simply be the current that is normally provided to output channel 20 when output channel 15, output channel 20, and middle channel 25 are not interconnected. This exemplary situation when input 45 (A) is high and input 50 (B) is low, is that shown in the first row of Table 1 above.

When input 45 (A) and input 50 (B) are high (according to row 4 in Table 1), both transmission gates 110 and 115 will act as pass-through gates, thereby converting multi-channel regulator 10 into a single-channel, single-output regulator. Output channel 10, output channel 15, and middle channel 25 will then be interconnected, which is the situation illustrated in the last row of Table 1.

The other two situations illustrated in Table 1 (rows 2 and 3 of Table 1) are similarly achieved by having transmission gate 110 act as an open circuit and transmission gate 115 act as a pass-through gate for the situation illustrated in row 2 of Table 1 and having both transmission gates 110 and 115 act as open circuits for the situation illustrated in row 3 of Table 1.

It should be understood by one skilled in the art that switching logic circuit 35 may be implemented in a different manner, using different logic gates. For example, if "n-channel" transistors are desired for both the top and bottom gates of output channel 15, output channel 20 and middle channel 25, then the "AND" gates illustrated in FIG. 3 may be substituted by "NOR" gates and $\overline{B_{OFF}}$ may become $B_{OFF}$.

Figure 4:
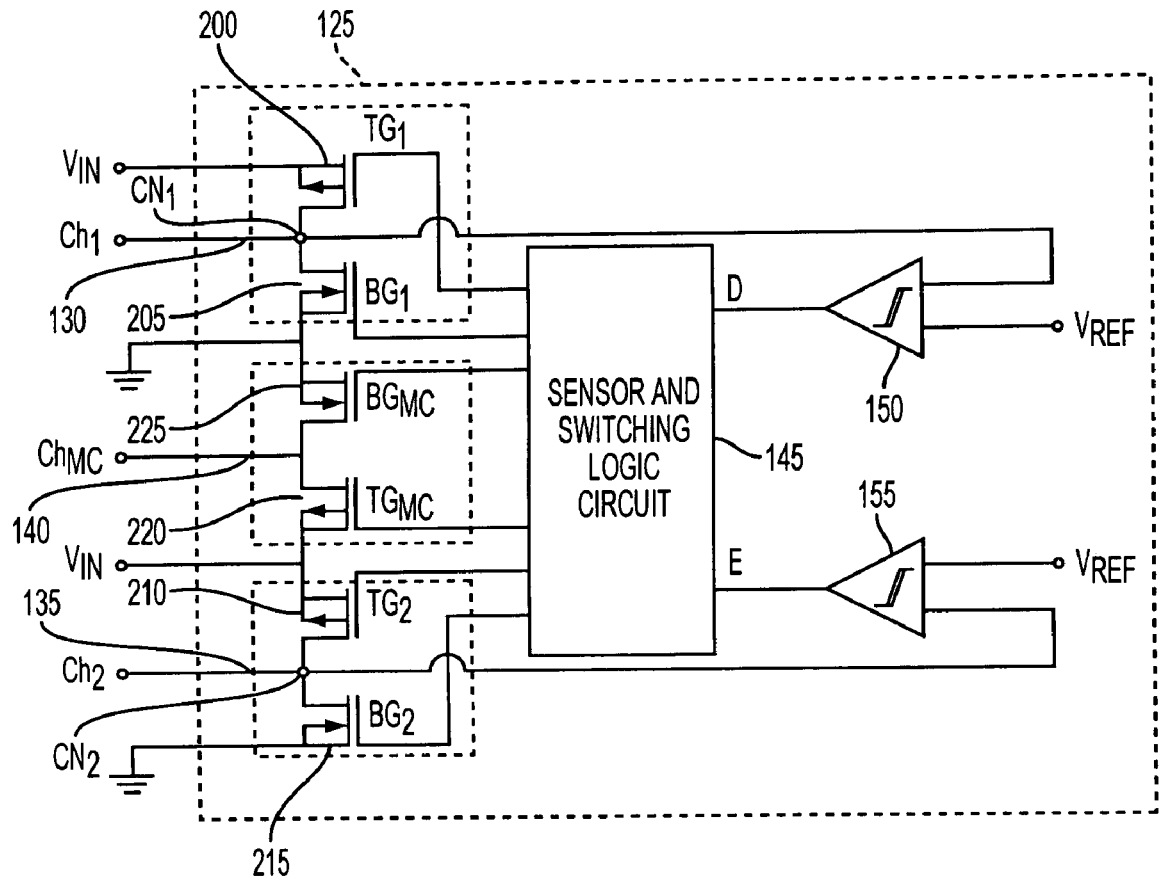
FIG. 4 is an illustrative circuit diagram showing a preferred embodiment of a multi-channel, dual-output monolithic switching regulator in accordance with the principles of the present invention.

Referring now to FIG. 4, an illustrative circuit diagram showing a preferred embodiment of a multi-channel monolithic switching regulator in accordance with the principles of the present invention is described.

Multi-channel monolithic switching regulator 125 has two output channels, namely channels 130 ("$Ch_1$") and 135 ("$Ch_2$"), to provide a regulated voltage or current at an output load. Multi-channel regulator 125 also has additional channel 140 ("Ch$_{MC}$"), referred to as "middle channel" 140, and sensor and switching logic circuit 145 to enable flexible current partitioning among output channels 130 and 135.

Flexible current partitioning is achieved by connecting middle channel 140 to one or more of output channels 130 and 135. The current distribution is controlled by sensor and switching logic circuit 145. Sensor and switching logic circuit 145 takes inputs "D" and "E" from comparators 150 and 155, respectively, and distributes the current to output channels 130 and 135 according to the logic values attributed to inputs D and E as a result of sensing the connection of channels 130–140.

Sensor and switching logic circuit 145 senses the external connection of channels 130–140 by turning the top and bottom switching elements of channel 140 ON/OFF while all the switching elements corresponding to output channels 130 and 135 are turned OFF. Voltage comparators 150 and 155 respectively monitor the voltages at conjunction node CN$_1$ of output channel 130 and conjunction node CN$_2$ of output channel 135 while circuit 145 determines how middle channel 140 is connected externally. Each conjunction node electrically is disposed between the top and bottom switches of its respective output channel.

An exemplary current distribution provided by multi-channel monolithic switching regulator 125 is illustrated in Table 2 below with reference to FIGS. 4 and 6. In a preferred embodiment, the sensing period is performed during the initial start-up phase of multi-channel monolithic switching regulator 125.

TABLE 2

Exemplary current distribution

| F | G | Channel Connection | Current Distribution |
|---|---|---|---|
| 1 | 0 | Ch$_{MC}$ connected to Ch$_1$ | I$_{OUT1}$ = I$_{Ch1}$ + I$_{ChMC}$<br>I$_{OUT2}$ = I$_{Ch2}$ |
| 0 | 1 | Ch$_{MC}$ connected to Ch$_2$ | I$_{OUT1}$ = I$_{Ch1}$<br>I$_{OUT2}$ = I$_{Ch2}$ + I$_{ChMC}$ |
| 0 | 0 | Ch$_{MC}$ disconnected | I$_{OUT1}$ = I$_{Ch1}$<br>I$_{OUT2}$ = I$_{Ch2}$ |
| 1 | 1 | Single channel operation (Ch$_1$, Ch$_2$, Ch$_{MC}$ all connected together) | I$_{OUT}$ = I$_{Ch1}$ + I$_{ChMC}$ + I$_{Ch2}$ |

For example, if the voltage on the conjunction node of output channel 130 goes high when the top switching element in middle channel 140 is ON and the bottom switching element in middle channel 140 is OFF, then sensor and switching logic circuit 145 determines that middle channel 140 is connected to output channel 130. For verification, the top switching element in middle channel 140 is subsequently turned OFF and the bottom switching element is turned ON. The voltage comparator corresponding to the first channel then verifies whether the voltage on the conjunction node of the first channel has dropped accordingly. After the sensing period, the switching logic circuit distributes the current to the output channels according to the external connection of the middle channels.

It should be understood by one skilled in the art that the current distribution shown in Table 2 is an exemplary current distribution shown for illustration purposes only.

It should also be understood by one skilled in the art that multi-channel regulator 125 may be designed as a buck, boost, or buck-boost regulator, current-mode or voltage-mode, or any other type used to implement monolithic switching regulators. According to its implementation, multi-channel regulator 125 may have other circuit components not shown in FIG. 4, such as error amplifiers, control circuitry, inductors, capacitors, etc.

In addition, one skilled in the art should understand that multi-channel regulator 125 is shown for illustration purposes only, and other multiple channel configurations may be used in accordance with the principles of the present invention. For example, a quad-channel regulator may be designed with two additional middle channels to achieve a higher number of current partitioning configurations than those illustrated in Table 2.

Referring now to FIGS. 5A–E, illustrative circuit diagrams showing the external channel connections for achieving the exemplary current distribution shown in Table 2 for the multi-channel, dual-output monolithic switching regulator shown in FIG. 4 are described. Multi-channel switching regulators 156–159 and 161 have two output channels, "Ch$_1$" and "Ch$_2$," and an additional middle channel, "Ch$_{MC}$", that are externally connected to provide the exemplary current distribution configurations illustrated in Table 2.

Multi-channel switching regulator 156 provides the current distribution illustrated in row 1 of Table 2, multi-channel switching regulators 157 and 161 provide the current distribution illustrated in row 2 of Table 2, multi-channel switching regulator 158 provides the current distribution illustrated in row 3 of Table 2, and multi-channel switching regulator 159 provides the current distribution of row 4 of Table 2.

Figure 5A:
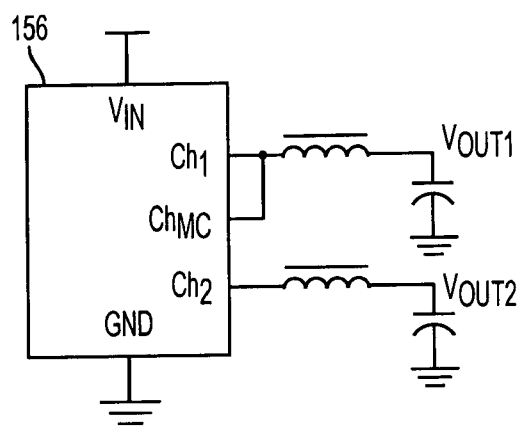
FIGS. 5A–E are illustrative circuit diagrams showing the external channel connections for achieving the exemplary current distribution shown in Table 2 for the multi-channel, dual-output monolithic switching regulator shown in FIG. 4.
Figure 5B:
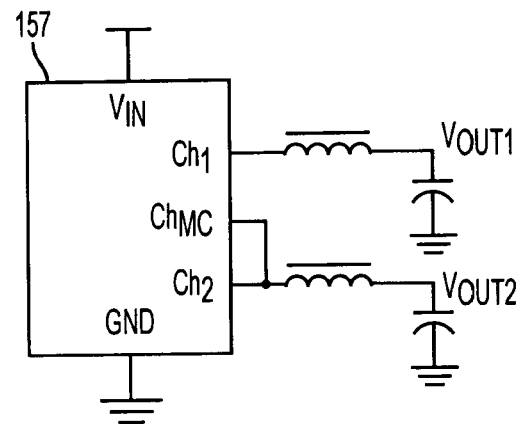
Figure 5C:
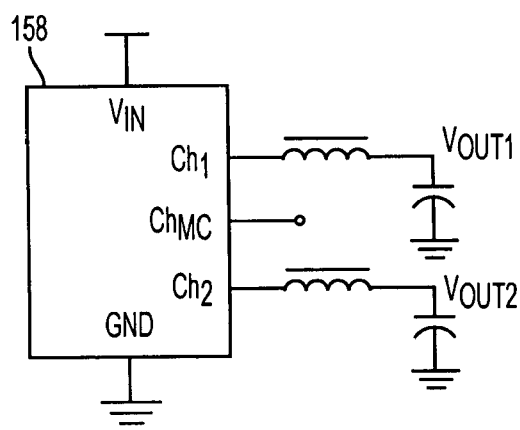
Figure 5D:
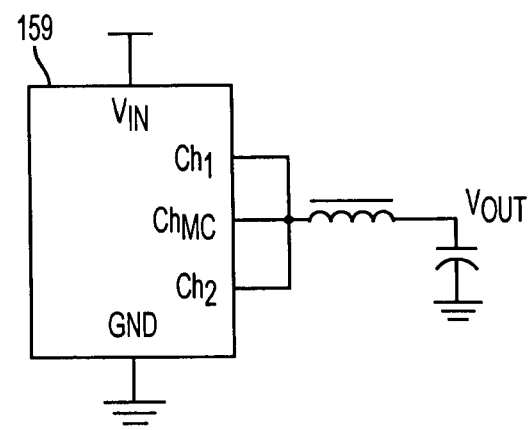
Figure 5E:
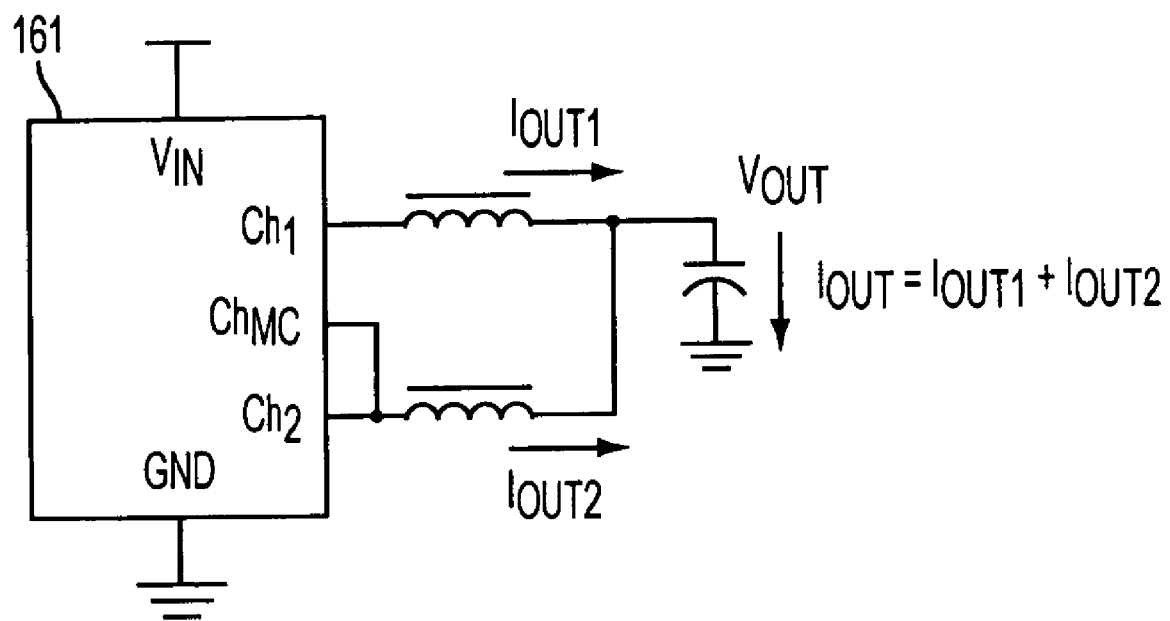

Switching regulator 161 shown in FIG. 5E operates as a multi-channel, single-output switching regulator by externally connecting Ch$_1$ and Ch$_2$ at the output capacitor. In this exemplary configuration, Ch$_1$ provides more current than Ch$_{MC}$ and Ch$_2$ individually but approximately the same current provided by the sum of Ch$_{MC}$ and Ch$_2$. By connecting the channels together as shown in FIG. 5E, the designer can easily convert a multi-channel, multi-output switching regulator into a multi-channel, single-output switching regulator as desired.

Figure 6:
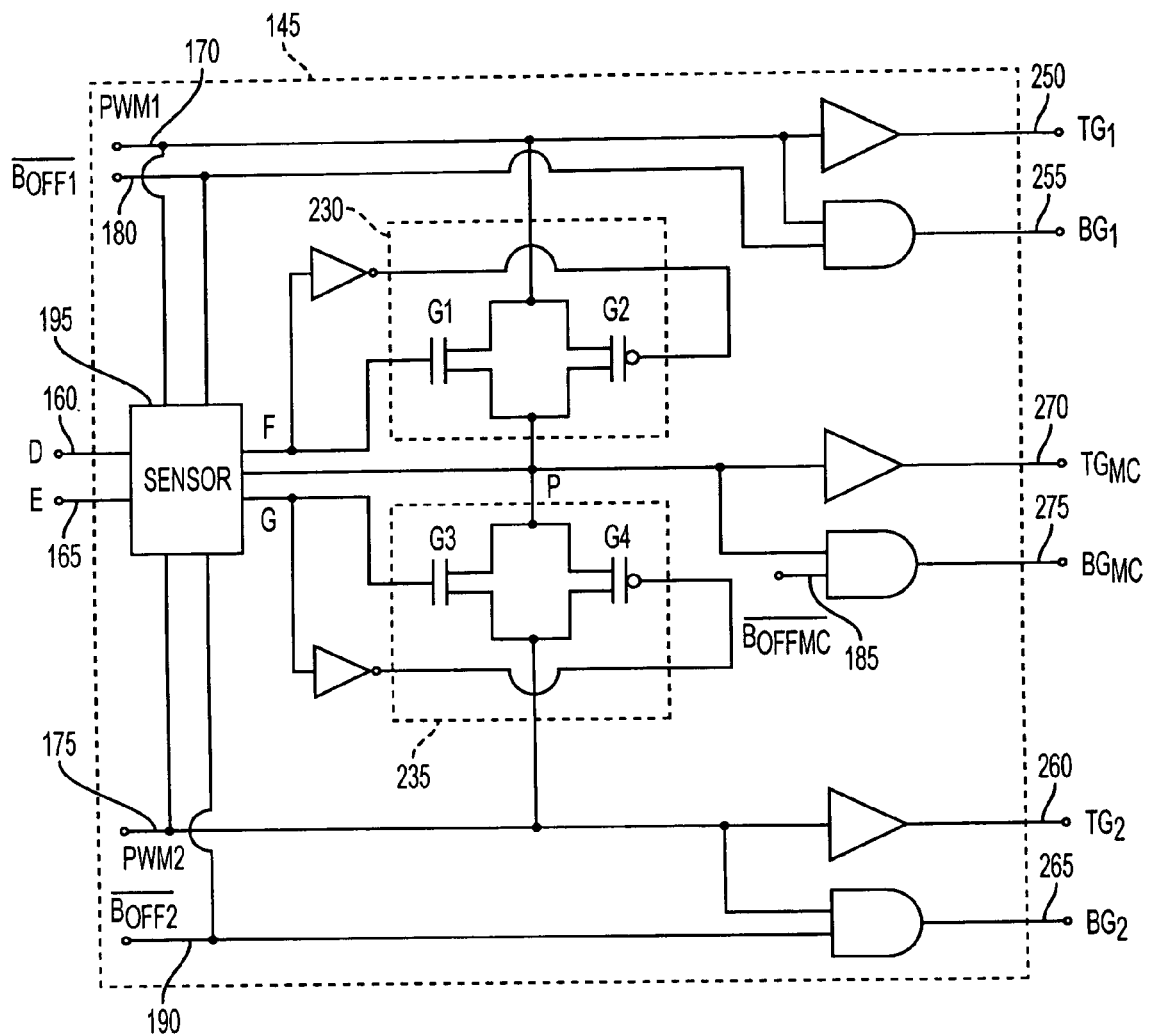
FIG. 6 is an illustrative circuit diagram of a sensor and switching logic circuit for use with the multi-channel, dual-output monolithic switching regulator shown in FIG. 4.

Referring now to FIG. 6, an illustrative circuit diagram of a sensor and switching logic circuit for use with the multi-channel monolithic switching regulator shown in FIG. 4 is described. Sensor and switching logic circuit 145 has seven inputs, namely: (1) input 160 ("D") coming from comparator 150 shown in FIG. 4; (2) input 165 ("E") coming from comparator 155 shown in FIG. 4; (3) input 170 ("PWM1") coming from a PWM logic block inside multi-channel regulator 125; (4) input 175 ("PWM2") coming from another PWM logic block inside multi-channel regulator 125; (5) input signal 180 ("$\overline{B_{OFF1}}$"); (6) input signal 185 ("$\overline{B_{OFFMC}}$"); and (7) input signal 190 ("$\overline{B_{OFF2}}$").

Sensor and switching logic circuit 145 has sensor 195 for sensing the connection of output channel 130, output channel 135, and middle channel 140, that is, for determining if and how channels 130–140 are externally interconnected by the designer. Sensor 195 may be implemented with a combination of switches and logic circuitry to control the operation of switching elements 200–225 via signals 250–275, which are coupled to gates TG$_1$, BG$_1$, TG$_2$, BG$_2$, TG$_{MC}$ and BG$_{MC}$ of switches 200–225 (respectively).

First, by permitting the appropriate signals to be supplied to signals 250–275, sensor 195 turns top switch 200 and bottom switch 205 of output channel 130 OFF and turns top switch 210 and bottom switch 215 of output channel 135 OFF while turning top switch 220 of middle channel 140 ON. Sensor 195 will then monitor the voltages of conjunction nodes CN$_1$ and CN$_2$, that is, the nodes between the top and bottom switches of each channel, to determine whether middle channel 140 is connected to output channel 130, output channel 135, or both.

For example, if the voltage on conjunction node $CN_1$ of output channel 130 goes high when top switch 220 of middle channel 140 is ON and bottom switch 225 of middle channel 140 is OFF, then sensor 195 determines that middle channel 140 is connected to output channel 130. Similarly, if the voltage on conjunction node $CN_2$ of output channel 135 stays low when top switch 220 of middle channel 140 is ON and bottom switch 225 of middle channel 140 is OFF, then sensor 195 determines that middle channel 140 is not connected to output channel 135. For verification, top switch 220 of middle channel 140 is subsequently turned OFF and bottom switch 225 is turned ON. Voltage comparator 150 then verifies whether the voltage on output channel 130 has dropped accordingly. If so, the logic value of line "F" is set to high, and the logic value of line "G" is set to low, thereby corresponding to the current distribution shown on the first row of Table 2 and described above with reference to FIG. 4. In this case, transmission gate 230 acts as a pass-through gate while transmission gate 235 acts as an open circuit.

Similarly, if the voltage on conjunction node $CN_2$ of output channel 135 goes high when top switch 220 of middle channel 140 is ON and bottom switch 225 of middle channel 140 is OFF, then sensor 195 determines that middle channel 140 is connected to output channel 135. Similarly, if the voltage on conjunction node $CN_1$ of output channel 130 stays low when top switch 220 of middle channel 140 is ON and bottom switch 225 of middle channel 140 is OFF, then sensor 195 determines that middle channel 140 is not connected to output channel 130. For verification, top switch 220 of middle channel 140 is subsequently turned OFF and bottom switch 225 is turned ON. Voltage comparator 155 then verifies whether the voltage on output channel 135 has dropped accordingly. If so, the logic value of line "F" is set to low, and the logic value of line "G" is set to high, thereby corresponding to the current distribution shown on the second row of Table 2 and described above with reference to FIG. 4.

The other two situations illustrated in Table 2 (rows 3 and 4 of Table 2) are similarly achieved by having sensor 195 respectively monitor the voltages on conjunction node $CN_1$ of output channel 130 and conjunction node $CN_2$ of output channel 135 when switches 220 and 225 are turned ON/OFF.

It should be understood by one skilled in the art that sensor and switching logic circuit 145 may be implemented in a number of ways, using different logic gates. For example, if "n-channel" transistors are desired for both the top and bottom gates of output channel 130, output channel 135 and middle channel 140, then the "AND" gates illustrated in FIG. 6 may be substituted by "NOR" gates.

It should also be understood by one skilled in the art that sensor 195 may be implemented with any combination of transistors and logic gates capable of controlling the operation of switches 200–225.

Although particular embodiments of the present invention have been described above in detail, it will be understood that this description is merely for purposes of illustration. Specific features of the invention are shown in some drawings and not in others, for purposes of convenience only, and any feature may be combined with other features in accordance with the invention. Steps of the described processes may be reordered or combined, and other steps may be included. Further variations will be apparent to one skilled in the art in light of this disclosure and such variations are intended to fall within the scope of the appended claims.

What is claimed is:

1. A monolithic switching regulator for flexibly distributing an output current among a plurality of output channels, the monolithic switching regulator comprising:

one or more middle channels for connecting to at least one of the plurality of output channels, said one or more middle channels that adds additional current to the at least one output channel when said one or more middle channels is connected to the at least one output channel; and a sensor and switching logic circuit for sensing the connection of the one or more middle channels to the at least one of the plurality of output channels and distributing the output current among the output channels according to the connection of the one or more middle channels to the output channels.

2. The monolithic switching regulator of claim 1, wherein each of the one or more middle channels comprises a first and a second switching element.

3. The monolithic switching regulator of claim 2, wherein the switching elements are selected from the group consisting of: FET switches; JFET switches; BJT switches; MOSFET switches; and diodes.

4. The monolithic switching regulator of claim 1, wherein the sensor and switching logic circuit comprises:

a sensor;

a plurality of transmission gates; and a plurality of logic gates.

5. The monolithic switching regulator of claim 4, wherein the sensor comprises a plurality of switching elements and a plurality of logic gates for sensing the connection of the one or more middle channels to the at least one of the plurality of output channels.

6. The monolithic switching regulator of claim 1, further comprising a plurality of voltage comparators.

7. A method for flexibly distributing the output current of a monolithic switching regulator among a plurality of output channels, the method comprising:

providing one or more middle channels for connecting to at least one of the plurality of output channels, said one or more middle channels that adds additional current to the at least one output channel when said one or more middle channels is connected to the at least one output channel;

autosensing the connection of the one or more middle channels to the at least one of the plurality of output channels; and distributing the output current among the output channels according to the connection of the one or more middle channels to the at least one of the plurality of output channels.

8. The method of claim 7, wherein providing one or more middle channels comprises providing first and second switching elements for each of the one or more middle channels.

9. The method of claim 8, wherein autosensing the connection of the one or more middle channels to the at least one of the plurality of output channels comprises:

(a) turning the first switching element in each of the one or more middle channels ON while turning the second switching element in each of the one or more middle channels OFF;

(b) monitoring the voltage on each of the plurality of output channels during step (a);

(c) turning the first switching element in each of the one or more middle channels OFF while turning the second switching element in each of the one or more middle channels ON; and (d) monitoring the voltage on each of the plurality of output channels during step (c).

10. The method of claim 9, wherein steps (b) and (d) comprises using a voltage comparator for each of the plurality of output channels.

11. The method of claim 10, further comprising providing a sensor to autosense the connection of the one or more middle channels to the at least one of the plurality of output channels, wherein the sensor senses the logic values provided by the voltage comparators and wherein distributing the output current among the plurality of output channels according to the connection of the one or more middle channels to the at least one of the plurality of output channels comprises distributing the output current according to the logic value provided by each voltage comparator associated with each of the plurality of output channels as sensed by the sensor.

12. A monolithic switching regulator for flexibly distributing an output current among a plurality of output channels, the monolithic switching regulator comprising:

one or more middle channels for connecting to at least one of the plurality of output channels, said one or more middle channels that adds additional current to the at least one output channel when said one or more middle channels is connected to the at least one output channel;

a programmable input pin for programming the connection of the one or more middle channels to the at least one of the plurality of output channels; and a switching logic circuit for distributing the output current among the plurality of output channels according to the connection of the one or more middle channels to the at least one of the plurality of output channels.

13. The monolithic switching regulator of claim 12, wherein each of the one or more middle channels comprises two switching elements.

14. The monolithic switching regulator of claim 13, wherein the switching elements are selected from the group consisting of: FET switches; JFET switches; BJT switches; MOSFET switches; and diodes.

15. The monolithic switching regulator of claim 12, wherein the switching logic circuit comprises a plurality of transmission gates and a plurality of logic gates.

16. The monolithic switching regulator of claim 12, further comprising a plurality of voltage comparators.

17. A method for flexibly distributing the output current of a monolithic switching regulator among a plurality of output channels, the method comprising:

providing one or more middle channels for connecting to at least one of the plurality of output channels, said one or more middle channels that adds additional current to the at least one output channel when said one or more middle channels is connected to the at least one output channel;

programming the connection of the one or more middle channels to the at least one of the plurality of output channels; and distributing the output current among the plurality of output channels according to the connection of the one or more middle channels to the at least one of the plurality of output channels.

18. The method of claim 17, wherein providing one or more middle channels comprises providing first and second switching elements for each of the one or more middle channels.

19. The method of claim 17, wherein programming the connection of the one or more middle channels to the output channels comprises providing a programmable input pin.

20. The method of claim 19, wherein programming the connection of the one or more middle channels to the at least one of the plurality of output channels comprises using a voltage comparator to compare the voltage of the programmable input pin with a reference voltage.

21. The method of claim 20, wherein distributing the output current among the plurality of output channels according to the connection of the one or more middle channels to the at least one of the plurality of output channels comprises distributing the output current according to the logic values provided by the voltage comparator.

* * * * *